April 27, 1965 J. A. FEHR, JR 3,181,102
ELECTRICAL BUSWAY APPARATUS
Filed June 8, 1964 3 Sheets-Sheet 3
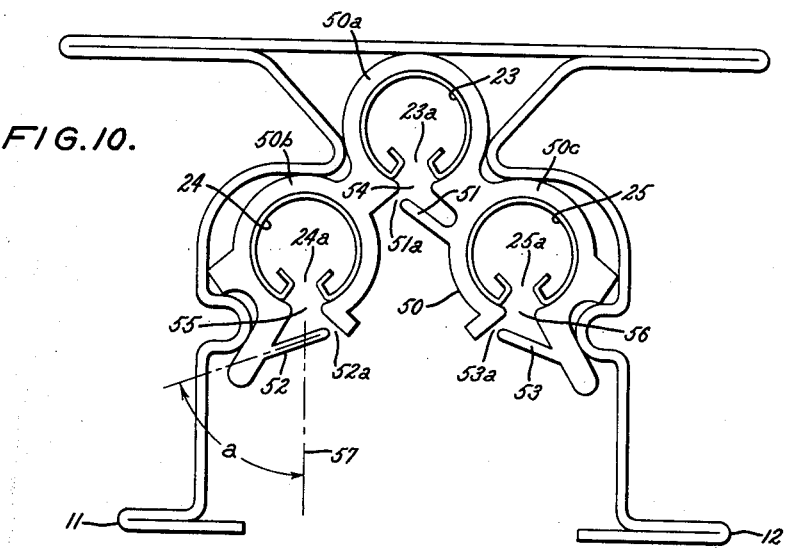
FIG.10.
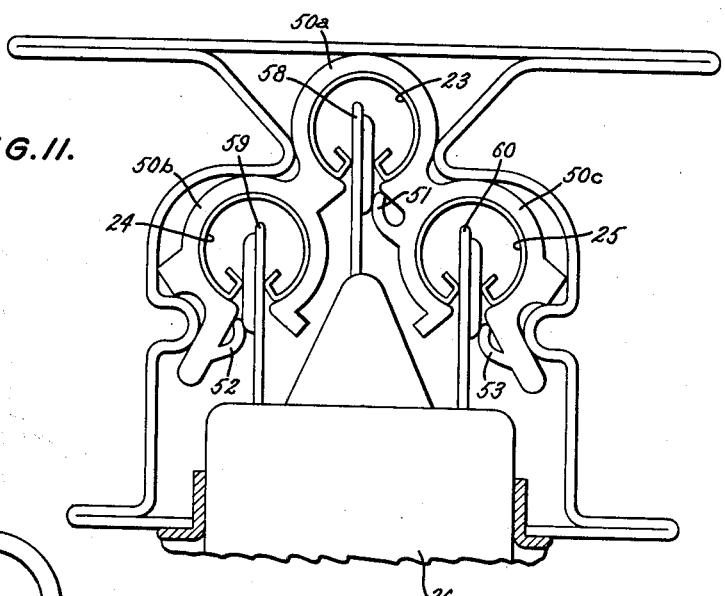
FIG.11.
FIG.12.
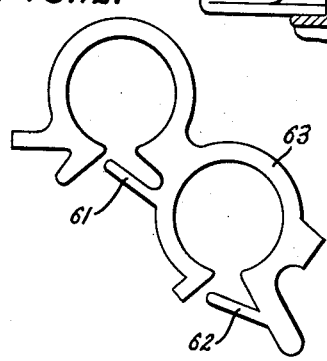
INVENTOR:
JOSEPH A. FEHR, JR.,
BY Irving B. Marshman
ATTORNEY.

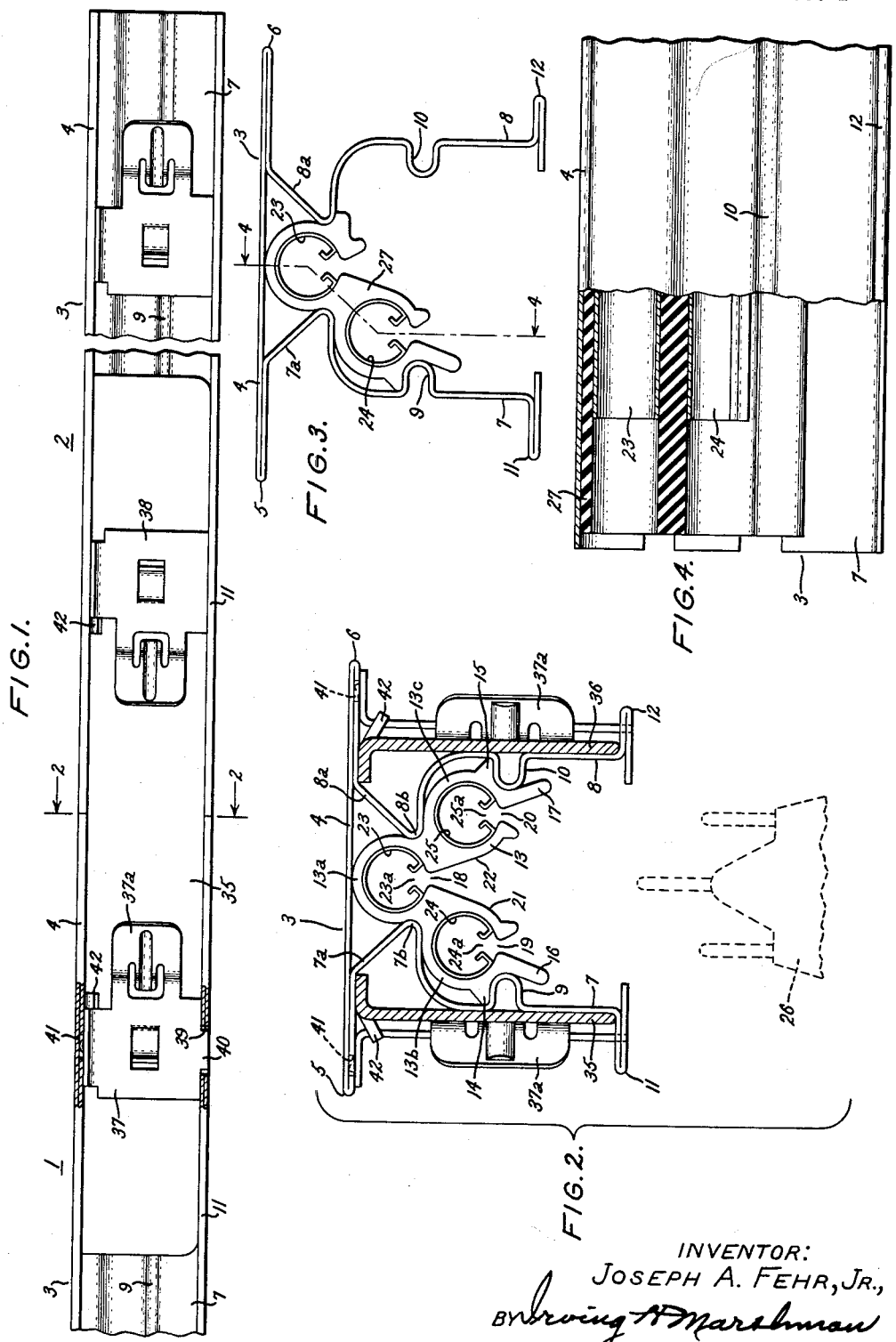

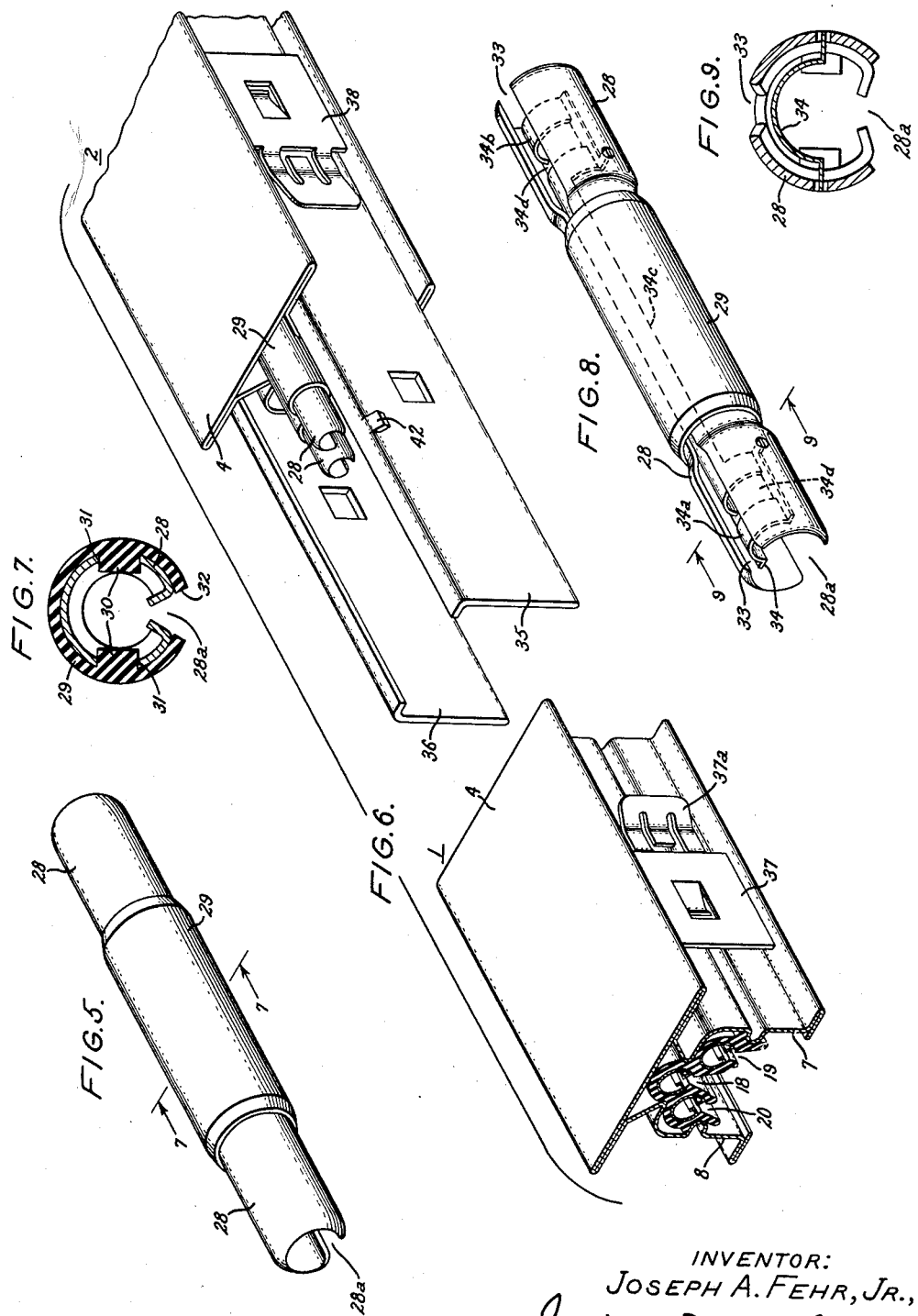

United States Patent Office 3,181,102
Patented Apr. 27, 1965

3,181,102
ELECTRICAL BUSWAY APPARATUS
Joseph A. Fehr, Jr., Simsbury, Conn., assignor to General
Electric Company, a corporation of New York
Filed June 8, 1964, Ser. No. 375,996
10 Claims. (Cl. 339—21)

This application is a continuation-in-part of my application S.N. 263,169, filed March 6, 1963, and now abandoned.

This invention relates to electrical distribution apparatus, more particularly to multisection electrical busway apparatus and it has for an object the provision of a simple, compact, reliable and improved busway apparatus of this character.

Another object of the invention is to economize the manufacture and thus to provide an inexpensive busway apparatus.

A more specific object of the invention is the provision of a busway apparatus the parts of which are inexpensive and capable of convenient installation.

Still more specifically, the invention relates to multiple section busway apparatus and a more specific object of the invention is the provision of a joint structure that may easily be assembled or disassembled without any tools.

Another object of the invention is the provision of a multisection busway apparatus in which the bus conductors are completely insulated and completely isolated from each other and from the bus housing throughout their entire length including the sectional joints.

A further object of the invention is the provision of a "dead front" busway, i.e., a busway in which the bus conductors are completely isolated from chance contact by operators or workmen working in or near the busway.

An additional object of the invention is the provision of a sectionalized busway structure in which a plug-in device may be plugged in at any point, including the joints, along the entire length of the busway.

It is also an object of the invention to provide for mounting the busway by hangers suspended from a surface or by attaching the busway directly to such surface.

Briefly, the invention comprises a sheet metal bus duct housing having a top wall, a base provided with two longitudinally extending lateral flanges and two spaced apart sidewalls interconnecting the top wall and the base flanges. The sidewalls converge from the top wall to form a restricted longitudinal throat opening and then diverge therefrom toward the base and are provided with internal longitudinally extending ribs disposed between the throat and the base. A multi-lobate resilient insulating member is mounted within the housing with one of its lobes disposed between and retained by the converging portions of the sidewalls and with another of its lobes disposed in the space between the restricted throat opening and one of the ribs. Each of the lobes has a longitudinal cavity and is provided with a longitudinal slot opening into the cavity and facing the base of the housing, and within each of these cavities is a longitudinally extending hollow conducting member having a longitudinal slot opening in register with the opening in the insulation lobe containing such cavity.

For a better and more complete understanding of the invention, reference should now be had to the following specification and to the accompanying drawings in which:

FIG. 1 is a view in elevation of two joined together sections of busway apparatus embodying the invention;

FIG. 2 is a sectional view of the busway taken on the line 2—2 of FIG. 1 looking in the direction of the arrows;

FIG. 3 is a sectional view of a modification;

FIG. 4 is a longitudinal sectional view taken on the line 4—4 of FIG. 3 looking in the direction of the arrows;

FIG. 5 is a view in perspective of an electrical connector used to connect electrically corresponding bus conductors of adjacent sections of the busway;

FIG. 6 is a view in perspective of adjacent end portions of two sections of the busway in position preparatory to being moved together to complete a joint;

FIG. 7 is a sectional view taken on the line 7—7 of FIG. 5 looking in the direction of the arrows;

FIG. 8 is a view in perspective of a modified form of connector,

FIG. 9 is a sectional view taken on the line 9—9 of FIG. 8,

FIG. 10 is a sectional view of a modification of the invention,

FIGURE 11 is a sectional view similar to FIG. 10 with a takeoff device plugged into the busway, and FIG. 12 is a cross sectional view of a two pole insulating member embodying the modification illustrated in FIG. 10.

Referring now to the drawing and particularly to FIGS. 1 and 6 thereof, portions adjacent the joint of two adjoining sections 1 and 2 of a multisection busway embodying the invention are illustrated in FIG. 1. Since the sections are identical, only section 1 will be described in detail. The basic construction of section 1 of the busway is illustrated in the cross-sectional view in FIG. 2. The housing 3 is produced from a blank of sheet metal, preferably roll formed steel which is folded on itself to provide a top wall 4 having spaced apart longitudinally extending lateral mounting flanges 5 and 6 and side walls 7 and 8 integrally connected with the top wall. The upper portions 7a and 8a of the sidewalls extend downwardly from the top wall and converge to form with the top wall a channel having a trapezoidal cross-section. This channel has a longitudinally extending throat opening defined by longitudinally extending edges 7b and 8b facing the bottom wall. From these edges the sidewalls diverge outwardly, approximately in quarter round fashion, and downwardly. Internally projecting, longitudinally extending ribs 9 and 10 are formed in the downwardly extending sections of the sidewalls 7 and 8 respectively. The sidewalls terminate at the bottom in portions bent perpendicularly outward and then doubled back on themselves to provide longitudinally extending base flanges 11 and 12. These base flanges extend a short distance inwardly from their corresponding sidewalls to form a base having a continuous longitudinally extending base opening communicating with the interior of the housing. As illustrated in FIG. 2, the base flange 11 extends outwardly from the sidewall a greater distance than does the flange 12 thereby to provide polarization and thus to prevent insertion of a connector plug or the like into the housing in an incorrect orientation. The upper flanges are referred to as mounting flanges because they provide for convenient mounting of the busway either directly to a surface or by means of hangers suspended from an overhead surface. In addition, the mounting and base flanges and sidewalls constitute, in effect, an I beam from which loads such as lighting fixtures may be suspended.

Within the housing 3 is mounted an insulation and bus conductor subassembly comprising an insulation body 13 having a plurality of longitudinally extending bus conductors therein. The insulation body has a multilobate form with a conductor carried in each of its longitudinally extending lobes. Thus in the three bus conductor embodiment illustrated in FIG. 2, the insulation body is tri-lobate and its cross-sectional configuration corresponds generally to the cross-sectional configuration of the interior of the housing between the top wall 4 and the longitudinal ribs 9 and 10. In this respect, as illustrated in FIG. 2, the distance between the edges 7b and 8b of the restricted throat opening is approximately equal to the altitude of the trapezoidal cross sectional area. The cross section of the top or central lobe 13a has a generally circular configuration. Its diameter is slightly greater than the distance between edges 7b and 8b. Hence, in the completed assembly the lobe 13a may be received in the trapezoidal cross-section channel adjacent the top wall 4 and retained and locked therein by the converging portions 7a and 8a of the sidewalls. The two laterally disposed lobes 13b and 13c are contoured to conform generally to the quarter rounded portions of sidewalls 7 and 8 and to have shoulder portions 14 and 15 that rest upon and are retained by the inwardly projecting longitudinally extending cylindrical cavity for receiving and retaining a conductor. The two lateral lobes 13b and 13c are terminated in tongue portions 16 and 17 that serve to prevent electrical creepage to the housing from energized conductors within the cavities. The three lobes are provided with longitudinally extending slots 18, 19 and 20 respectively that communicate from their conductor receiving cavities to the interior of the housing and face the plane of the base flanges. In order to serve as a guide for plug-in devices, the two lateral lobes 13b and 13c are configured to present opposing surfaces 21 and 22 diverging from the edges of the slot 18 to form a channel of generally triangular cross section. The sidewalls of the entrances to slots 19 and 20 also diverge as illustrated in FIG. 2. The multilobate insulation body may be made of any suitable insulating material that is pliable and resilient and may be formed to the desired configuration by any suitable method. For example, it may be made of a polyvinyl chloride and may be extruded through forming dies to produce the desired configuration. Alternatively, instead of a circular configuration, the cross section of the central lobe 13a may have a dovetail configuration. In some cases this may have certain advantages.

Disposed within the longitudinal cavities of the insulating body are cylindrical tubular bus conductors 23, 24 and 25. These conductors are provided with longitudinally extending slots 23a, 24a and 25a defined by the surfaces of narrow marginal portions of the wall that are bent to provide radially inwardly converging portions and edge flanges diverging from the inner edges thereof. The conductors are positioned within the cavities so that their slots are in register with the slots 18, 19 and 20 of the insulation body. Thus, a plug-in device 26 may be plugged in the busway at any point along the length thereof and the stabs of the plug will extend through the openings of the insulating body and into the slots of the conductors. When plugged in, the stab contacts are pinched by the inwardly bent edges of the conductor to provide a good metal-to-metal contact. These conductors may be made of any good conductor material such as copper or aluminum roll formed to the desired configuration. As shown, they are in the form of hollow tubes. Conductors having different wall thicknesses, but the same outside diameters will have different ampere ratings. As an example, a conductor having a wall thickness of .01 inch may have a rating of 30 amperes, whereas a conductor of the identical outside diameter having a wall thickness of .02 inch may have a rating of 60 amperes. Since the outside diameters of the conductors for both ratings are identical, the same insulation may be used for either rating. Thus it is not necessary to stock differently dimensioned insulations for the manufacture of busways of different ampere ratings.

Instead of the three-pole construction of busway illustrated in FIG. 2, a two-pole construction may be produced by mounting conductors in only two of the lobes of the insulation body. Alternatively a two-pole construction may be made by using an extrusion from which one of the lateral lobes is omitted such as the bi-lobate extrusion 27 illustrated in FIG. 3. It will be noted that the conductors are completely isolated from chance contact by personnel working on or near the busway. That is to say, the busway is "dead front" because of the configuration of the insulation body which surrounds the conductors and provides a barrier to fingers or to any but rather pointed tools.

The housing sections are made in convenient lengths, such for example as any length from 5 feet to 10 feet, and the insulation body is cut in lengths approximately equal to the length of the housing sections. In the bi-lobate insulation body and bus conductor subassembly, the ends of the conductors 23 and 24 are recessed a short distance, e.g., cut back between ¼ and ½-inch from the end o fthe insulation 27 to provide oversurface clearance to ground as illustrated in FIG. 4. Similarly in the tri-lobate configuration of FIG. 2, the ends of conductors 23, 24 and 25 are cut back the same amounts.

For the purpose of electrically interconnecting two adjacent sections of busway, special electrical connectors are provided for interconnecting corresponding conductors of the adjacent sections. A connector 28 is illustrated in FIG. 5. It comprises a tubular member made of a good conducting material such as the material of which the bus conductors are made. It is several inches in length and has an outside diameter only slightly smaller than the inside diameter of the busway conductors so as to provide a snug telescopic fit when the connector is inserted into the end openings of corresponding bus conductors in adjacent busway sections. The connector is provided with a longitudinal slot 28a similar to the slots in the bus conductors and adapted to register therewith when the connection is made. The connector is also provided with an external insulating sleeve 29 about its midportion. As shown in FIG. 7, this sleeve is provided with centrally disposed inwardly projecting retention bosses 30 and the connector 28 is provided with a mating transverse hole 31 which receives the bosses 30 when the sleeve and connector are properly assembled thereby to lock them in proper relative positions. The sleeve 29 is provided with a longitudinal slot similar to the slot 28a in the connector. When the sleeve and connector are assembled with bosses 30 in position in holes 31, the slot 32 is in register with slot 28a thereby providing for insertion of the stabs of a plug-in device and making it possible to plug in the plug-in device directly at a joint as well as anywhere along the length of the busway.

A modified form of connector is illustrated in FIG. 8. In this modification the outside diameter of the end portions of the metallic connector 28 is slightly, i.e., a few thousandths of an inch, greater than the inside diameters of the bus conductors 23, 24 and 25. In addition to the slot 28a, each of the end portions is provided with a diametrically opposite slot 33 which bifurcates each end portion into two spaced apart contact prongs. This makes it possible, by pinching the prongs together, to insert each end of the connector into the end opening of the corresponding bus conductor. As a result of bifurcation, the end plug-in portions of the connector lose some of their resiliency. For the purpose of adding resiliency to the connector a spring 34 is provided for loading the joint. This spring has two semicircular end portions 34a and 34b that are joined by a yoke 34c. The length of this yoke is determined so that when the spring is centered longitudinally in position within the tubular connector 28, the end portions 34a and 34b are disposed within the bifurcated end portions.

Each end portion of the spring is provided with an aperture 34d which in effect, divides it into two separate semicircular springs. The spring constant of these two springs is determined by the axial length of the aperture. If the aperture had zero length the resulting structure would be a single, relatively long spring having a relatively large constant. The diameters of the semicircular end portions 34a and 34b are smaller than the inside diameter of the connector sleeve 27. This results in clearance between the curved portion of the spring and the inner surface of the connector when the connector is inserted into the ends of adjoining bus conductors and the contact prongs have been pinched together. The resulting joint is strong and rigid and the bifurcated contact portions are held firmly in contact with the inside surface of the bus conductors.

For the purpose of mechanically joining two adjacent sections of the busway, two coupling plates 35 and 36 are disposed on opposite sides of the housing overlying both sections on either side of joint as ilustrated in FIGS. 1, 2 and 6. Resistance to bending of the housing at the joint is provided by the close fit between the top and bottom edges of the coupling plates and the upper and lower flanges of the housing.

The coupling plates are secured against the sidewalls of the housings by means of coupling clips. Two such coupling clips 37 and 38 mounted on the same side of adjacent housing sections 1 and 2 are illustrated in FIG. 6. On the other side of the housing two additional coupling clips are provided, one for each of the adjacent sections as indicated in FIG. 2. The base flanges of the housing sections as illustrated in FIG. 1 are provided, at either end, with a slot 39 for receiving tongue projection 40 on the lower edge of the clip and the upper flanges have indentations 41 for receiving a tab on the upper edge of the clip. This makes it possible to snap the clips into place without the use of tools. Instead of being snapped into position, a clip could be secured by other means such as rivets.

To join two adjacent sections, connectors 28 are fitted to the ends of the bus conductors of one of the two sections that are to be joined. This is done by telescoping the conductor portions of the connectors into the end openings of the bus conductors of one of the sections, e.g., as shown in FIG. 6 they are fitted to the bus conductors of busway section 2. Coupling plates 35 and 36 are assembled to one end of the housing 3 of section 2 by insertion between the clip 38 and the sidewall. When each coupling plate has been inserted the correct distance, a spring on the clip engages a hole in the coupling plate thereby to prevent its unintentional withdrawal. At this point also, tab 42, projecting outwardly from the coupling plate meets the forward edge of the coupling clip and prevents the coupling plate from travelling farther. When this has been done, the two adjacent busway sections to be joined are aligned as illustrated in FIG. 6.

To complete the joint, it is necessary only to push the two lengths of busway together until they meet as illustrated in FIG. 1. As the two housing sections are pushed together, the extending ends of the coupling plates on section 2 of the busway engage the sidewalls of section 1 and guide the movement of section 2 accurately so that when the connectors engage the bus conductors of section 1 they are aligned and telescoped into final position without the exercise of any special skill or effort on the part of the assembler.

To disassemble a joint, it is necessary merely to press inwardly on the edge of the sloping tongues 37a of the two clips on one of the sections of busway to release the coupling plates. With the tongues thus depressed, the busway sections may be separated simply by pulling them apart. Thus it is seen that, owing to the guidance provided by the coupling plates during the completion of the joint, very little skill is required and it is further seen that the joint may be completed and taken apart without the use of tools of any kind.

In applications in which a higher degree of dead front protection is desirable the modified resilient insulating member illustrated in FIGS. 10, 11 and 12 is employed. The modified three lobe insulating member 50 illustrated in FIGS. 10 and 11 is generally similar to the three lobe insulating member 13 illustrated in FIG. 2. The insulating member 50 differs from the insulating member 13 primarily in the provision of integral flexible flaps 51, 52 and 53 which are substantially coextensive in length with the insulating member. These flaps 51, 52 and 53 extend across the paths of entry to the longitudinally extending slots 54, 55 and 56, respectively, in the lobes 50a, 50b and 50c of the insulating member. Similarly they extend across the paths of entry to the slots 23a, 24a and 25a in the bus bar conductors since the slots in the insulating member are in register with the slots in the conductors.

The flaps are anchored to the insulating member along longitudinally extending lines that are spaced from the edges of the corresponding slots by a substantial distance so that when deflected by contacts being plugged into the busway they do not enter the slots.

In order to facilitate the deflection or flexing of the flaps to one side by the entering contacts of a plug, the insulating member is constructed so that in the assembled state, the flaps extend at an angle to the direction of entry of a contact. The angle is such that the distance from the free end of the flap to the adjacent edge of the slot is less than the distance from the anchored end to the opposite edge of the slot. By way of example, the angle $a$ between the flap 52 and a line 57 representing the direction of contact entry may be approximately 70 degrees. Similarly, the corresponding angles of flaps 51 and 53 with respect to the direction of contact entry may appropriately have approximately the same value.

As seen in FIG. 10 the narrow slots 51a, 52a and 53a between the ends of the flaps and the adjacent surfaces of the insulating member are not in alignment in the plug-in direction with the slots 54, 55 and 56 adjacent the entrances to the slots in the bus bars. Thus the insulating member 50 presents a true "dead front" toward the opening between the base flanges 11 and 12 of the busway housing. Access to the bus bars can only be had by deflecting the flaps.

The manner in which the flaps 51, 52 and 53 are deflected out of the path of the stab contacts 58, 59 and 60 of plug 26 is illustrated in FIG. 11.

In busway installations requiring only two bus bars, the two pole insulating element 63 illustrated in FIG. 12 may be employed. For the purpose of providing "dead front" protection it is provided with integral flexible flaps 61 and 62 which are substantially identical with the flaps 51 and 53 illustrated in FIG. 10 and perform the same functions in the same manner.

Although the invention has been described as embodied in specific forms, it will be understood that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. An electric busway power distribution apparatus comprising:
   (1) a sheet metal busway housing having
      (a) a top wall,
      (b) two longitudinally extending base flanges spaced apart to provide a longitudinally extending base opening and
      (c) two spaced apart sidewalls interconnecting said top wall and said base flanges and converging from said top wall to form therewith a channel of trapezoidal cross section having a restricted throat opening directed toward the plane of said base flanges,
      (d) said sidewalls diverging from said restricted throat opening and provided with longitudinally extending ribs disposed between said throat opening and said base flanges,
   (2) a continuous resilient multilobate insulating member within said housing having
      (a) one of its lobes disposed within said channel for retention by the converging sidewalls thereof and having another of its lobes disposed in the space between an edge of said throat opening and one of said ribs, (b) each of said lobes having a longitudinal slot opening directed toward the plane of said bottom flanges and (3) a plurality of hollow tubular conducting members each disposed longitudinally within a different one of said lobes and each having a longitudinal opening in register with the longitudinal slot opening of its encasing lobe.

2. An electric busway power distribution apparatus comprising:

(1) a sheet metal busway housing having
   (a) a top wall,
   (b) two longitudinally extending base flanges spaced apart to provide a longitudinally extending base opening and
   (c) two spaced apart sidewalls interconnecting said top wall and said base flanges and converging from said top wall to form therewith a channel of generally trapezoidal cross section having a restricted throat opening directed toward the plane of said base flanges,
   (d) said sidewalls diverging from said restricted throat opening and each provided with a longitudinally extending rib disposed between said throat opening and the plane of said base flanges, (2) a continuous resilient insulating member having a plurality of longitudinally disposed lobes each provided with a longitudinally disposed cavity for enclosing and supporting a conductor,
   (a) one of said lobes being disposed within said channel for retention by the converging sidewalls thereof,
   (b) another of said lobes being disposed in the space between an edge of said throat opening and one of said ribs and having a shoulder portion contoured to conform to a major portion of the surface of the associated rib and terminated in a tongue extension providing resistance to creepage from a conductor within its cavity to said housing;
   (c) each of said lobes having a longitudinal slot through the portion of its wall facing the plane of said base flanges and
   (d) a plurality of hollow tubular conducting members each disposed in the cavity of a different one of said lobes and each having a longitudinal slot through its wall in register with the longitudinal slot of its enclosing lobe; the slot in each of said lobes constituting a plug-in opening providing for insertion of a plug-in contact by rectilinear motion perpendicular to the plane of said base flanges.

3. An electric busway power distribution apparatus comprising:

(1) a sheet metal busway housing having
   (a) a top wall having opposite lateral portions folded double on themselves to provide two spaced apart longitudinally extending double thickness mounting flanges,
   (b) two longitudinally extending lateral base flanges spaced apart to provide a longitudinal opening communicating to the inside of said housing and
   (c) two spaced apart sidewalls interconnecting the inner longitudinal edges of said mounting flanges and said base flanges and converging from said top wall to form therewith a channel having a trapezoidal cross section with a restricted longitudinal throat opening directed toward the plane of said base flanges,
   (d) said sidewalls diverging from the edges of said restricted throat opening and each provided with an internal longitudinally extending rib, (2) a continuous resilient insulating member having a plurality of longitudinally disposed lobes each provided with a longitudinally disposed cylindrical cavity for enclosing and supporting a conductor and each having a longitudinal slot through the portion of its wall facing the plane of said base flanges,
   (a) a first of said lobes being disposed within said channel for retention by the pressure of the edges of said throat opening,
   (b) a second of said lobes being disposed in the space between one edge of said throat opening and a rib in a first of said sidewalls,
   (c) the longitudinal central axes of said cavities extending generally parallel to each other in the space between said top wall and a plane common to the rib in said first side wall and the edge of said throat opening in the other of said sidewalls, and (3) a plurality of hollow tubular conductors each disposed within the cavity of a corresponding one of said lobes and each having a longitudinal slot in register with the slot of its enclosing lobe.

4. An electric busway distribution apparatus comprising, (1) a sheet metal busway housing having
   (a) a top wall,
   (b) two longitudinally extending lateral base flanges,
   (c) two spaced apart side walls interconnecting said top wall and said base flanges and converging from said top wall to form therewith a channel having a restricted throat opening,
   (d) said sidewalls diverging from the edges of said throat opening and each provided with an internal longitudinally extending rib disposed approximately midway between said throat and one of said base flanges.

(2) a continuous resilient insulating member having three longitudinally disposed lobes each provided with a longitudinally disposed cylindrical cavity for enclosing and supporting a conductor with
   (a) a first of said lobes positioned within said channel for retention by said converging sidewalls and
   (b) each of the second and third lobes disposed within a space between a corresponding edge of said throat opening and a corresponding one of said ribs and
   (c) each of said lobes having a longitudinal slot communicating with its cavity and facing the plane of said base flanges,
   (d) said second and third lobes having side walls diverging from the edges of the longitudinal slot of said first lobe to provide a channel of generally triangular cross section and (3) three hollow tubular conductors each disposed within the cavity of a corresponding one of said lobes and each having a longitudinal slot in register with the slot of its enclosing lobe formed by inward bends of its longitudinal marginal edges.

5. A plural section busway power distribution apparatus, each section of said apparatus comprising:

(1) a unitary sheet metal busway housing having
   (a) a top wall,
   (b) sidewalls integrally connected with said top wall and converging therefrom to form therewith a channel having a restricted longitudinal throat opening,
   (c) said sidewalls diverging from the edges of said throat opening and terminating at the bottom in outwardly bent portions doubled on themselves to provide longitudinally disposed lateral base flanges spaced apart to provide a continuous longitudinally extending base opening, (d) each of said sidewalls being provided with an internal longitudinally extending rib disposed between the base flange and said throat, (2) a longitudinally extending resilient insulating member coextensive in length with said housing section and locked in position therein by said restricted throat and one of said ribs, (3) a plurality of longitudinally extending cylindrical cavities in said insulating member and a separate longitudinally extending slot for each of said cavities and communicating therewith through the portion of the wall said insulating member facing said base flanges, (4) a plurality of tubular bus conductors each disposed within a different one of said cavities and having a longitudinal slot in register with the longitudinal slot communicating with its enclosing cavity and having its ends recessed from the ends of said insulating member, (5) a connector for each bus conductor and the corresponding bus conductor in an adjoining housing section comprising a relatively short length of tubular conductor having slotted end portions and a central portion provided with an insulating sleeve cut back at both ends to provide for the insertion of the bare ends of said short conductor into the open ends of corresponding bus conductors in adjoining housing sections (a) said insulating sleeve being of smaller diameter than said cylindrical cavities to provide for telescoping said sleeve within the corresponding cavities of adjoining housing sections, (b) said connector conductors and said sleeves having longitudinally extending slotted plug-in openings in register with each other and with the slots in said bus conductors when said connector conductors are inserted therein.

6. An electric busway power distribution apparatus comprising:

(1) a sheet metal busway housing having a top wall, two longitudinally extending base flanges spaced apart to provide a longitudinally extending base opening and two spaced apart sidewalls interconnecting said top wall and said base flanges, (2) three tubular conducting members arranged within said housing with their coplanar cross sections in a triangular configuration, each having a longitudinally extending slot facing said base opening, (3) the longitudinal axes of a first and second of said conducting members being disposed in spaced apart relationship in a common plane extending generally parallel to the longitudinal axis of said housing, and the axis of the third of said conducting members being disposed between said common plane and said top wall in a plane disposed between said first and second conducting members perpendicular to said common plane, and (4) a continuous resilient trilobate longitudinally extending insulating member within said housing for supporting each of said conducting members in a corresponding one of its lobes, each of said lobes having a longitudinally extending slot in register with the slot in the bus bar supported therein.

7. An electric busway power distribution apparatus comprising:

(1) an elongated resilient insulating member having at least one bus bar receiving channel therein substantially coextensive lengthwise thereof;

(2) an elongated bus bar conductor contained in said channel;

(3) said insulating body having a slot therein substantially co-extensive lengthwise thereof, said slot being contiguous with said channel and affording access to said bus bar conductor in said channel by a contact member by movement along a predetermined path extending in a first direction;

(4) said insulating body including an integral flap substantially co-extensive lengthwise with said insulating body extending across the path of entry to said slot and terminating adjacent said insulating body at the opposite side of said path of entry, said flap being anchored to said insulating body on a line spaced from said slot whereby said flap when deflected by said contact member does not enter said slot.

8. An electric busway power distribution apparatus comprising:

(1) an elongated resilient insulating member having at least one bus bar receiving channel therein substantially co-extensive lengthwise thereof;

(2) an elongated bus bar conductor in said channel;

(3) said insulating body having a slot therein substantially co-extensive lengthwise thereof, said slot being contiguous with said channel and affording access to said bus bar conductor in said channel by a contact member by movement along a predetermined path extending in a first direction;

(4) said insulating body including a forwardly-projecting portion projecting beyond said slot in said first direction at least one side of said slot; and (5) said insulating body including an integral flap substantially coextensive with said insulating body extending across said predetermined path, said flap being anchored to said forwardly-projecting portion of said insulating body on a line spaced from said slot whereby said flap, when deflected by said contact member does not enter said slot.

9. Electric busway power distribution apparatus as set forth in claim 8 wherein said insulating body also includes a second forwardly-projecting portion projecting beyond said slot in an outward radial direction at the side of said slot opposite said first forwardly-projecting portion and said flap has its outer edge disposed closely adjacent said second forwardly-projecting portion.

10. Electric busway power distribution apparatus as set forth in claim 8 wherein said flap extends at an angle substantially less than a right-angle to the said path of movement of said contact member, whereby the movement of said flap when deflected by said contact is at an angle to said path of movement.

References Cited by the Examiner
UNITED STATES PATENTS

| 2,441,461 | 4/48 | Wayne | 339—21 |
| 2,669,632 | 2/54 | Hammerly | 339—23 X |
| 3,155,207 | 11/64 | Blemly et al. | 191—23 |

FOREIGN PATENTS

| 1,261,306 | 4/61 | France. |

JOSEPH D. SEERS, *Primary Examiner.*